United States Patent [19]
Soya

[11] 3,848,458
[45] Nov. 19, 1974

[54] SYSTEM FOR DETECTING ABNORMALITIES IN PIPELINES

[75] Inventor: Masahiro Soya, Kawasaki City, Japan

[73] Assignee: Tokico Ltd., Kawasaki City, Kanagawa-Ken, Japan

[22] Filed: Dec. 27, 1972

[21] Appl. No.: 318,856

[30] Foreign Application Priority Data
Dec. 28, 1971 Japan.............................. 46-003390
Apr. 12, 1972 Japan.............................. 47-036766

[52] U.S. Cl. .............................. 73/40.5 R, 340/242
[51] Int. Cl. ............................................. G01m 3/08
[58] Field of Search ............... 73/40.5 R, 40.5 A, 40, 73/49.1, 3; 340/242; 138/97

[56] References Cited
UNITED STATES PATENTS

| | | | |
|---|---|---|---|
| 2,772,561 | 12/1956 | Plank et al................................ | 73/3 |
| 3,060,315 | 10/1962 | Scherbatskoy.................. | 73/40.5 R |
| 3,397,570 | 8/1968 | Pfrehm ..................................... | 73/3 |
| 3,421,360 | 1/1969 | Luse et al.................................. | 73/3 |
| 3,541,837 | 11/1970 | Davis et al................................ | 73/3 |
| 3,643,489 | 2/1972 | Davis et al................................ | 73/3 |

*Primary Examiner*—Richard C. Queisser
*Assistant Examiner*—Joseph W. Roskos
*Attorney, Agent, or Firm*—Eric H. Waters

[57] ABSTRACT

A pipeline abnormality detecting system comprises a traveling body for traveling together with a fluid through a pipeline, traveling body detecting means comprising at least one pair of sensors disposed apart in the pipeline to define therebetween a pipeline section wherein abnormalities are to be detected and operating to detect passage thereby of the traveling body, a flowmeter for measuring the flowrate of the fluid introduced into the pipeline at its upstream end and accordingly producing a measuring pulse signal, and counting means operating in response to a signal from the upstream sensor of the pair of sensors to start counting the measuring pulse signal and in response to a signal from the downstream sensor to stop counting. The counting means operates further when its count value exceeds a specific preset value to generate an output signal for producing an alarm.

4 Claims, 5 Drawing Figures

SYSTEM FOR DETECTING ABNORMALITIES IN PIPELINES

BACKGROUND OF THE INVENTION

This invention relates to a system for detecting abnormal conditions, such as leaks, in conduit passageways such as pipelines. More particularly, the invention relates to a system for detecting sections in which points of such abnormal conditions as leaks exist of pipelines for conducting fluids.

Heretofore, the following systems have been resorted to for detecting pipeline leakages of this nature, but each has been accompanied by difficulties as noted.

1. The system which comprises installing a flowmeter at each of the upstream and downstream ends of the pipeline, monitoring the measurings of both flowmeters, and detecting the existence of a leak from the detection of a difference in the two measurings.

While this system affords detection of the existence of a leak somewhere in the pipeline, it is not possible thereby to detect the approximate position of the section where the leak exists. Furthermore, this system has other drawbacks such as low detection accuracy.

2. The system wherein leakage detectors are installed outside of the pipe structure of the pipeline.

This system is subject to external disturbances at the time of detection, and, furthermore, the accuracy and the state of installation of the leakage detectors are influenced by the installation conditions of the pipeline.

3. The system wherein a traveling device for picking up and recording sound waves emitted by leaks is caused to travel together with the fluid stream through the pipeline, one example of this system being described in the specification of U.S. Pat. No. 3,561,256.

This system is disadvantageous in that the traveling device is of complicated construction, and in that the discovery of a leak cannot be made promptly. Furthermore, detection of an abnormal condition within the pipe structure cannot be positively accomplished.

SUMMARY OF THE INVENTION

Accordingly, it is a general object of the present invention to provide a new and useful system for detecting pipeline abnormalities in which the above described difficulties accompanying the prior art are overcome.

More specifically, it is an object of the invention is to provide a system whereby the existence or nonexistence of an abnormality such as a liquid leakage within any of several specific sections of a pipeline can be positively detected with that specific section as a unit.

Another object of the invention is to provide a pipeline abnormality detection system wherein only a single traveling structure for detecting leaks which travels through the pipeline is sufficient and, moreover, may be of very simple construction.

Still another object of the invention is to provide a pipeline abnormality detection system wherein use is made of sensors for positively detecting the passage thereby of a traveling structure.

A further object of the invention is to provide an abnormality detection system capable of accomplishing centralized surveillance from a single station of points of abnormalities such as fluid leaks even in pipelines extending over long distances.

An additional object of the invention is to provide a pipeline abnormality detection system having a traveling structure capable of traveling smoothly within and through even a pipeline having curves and/or convexities within the pipe and, moreover, of thus traveling as it positively seals the liquid downstream and upstream therefrom from flowing therepast.

Other objects and further features of the present invention will be apparent from the following detailed description with respect to preferred embodiments of the invention when read in conjunction with the accompanying drawings, in which like parts are designated by like reference numerals.

DETAILED DESCRIPTION

Figure 1:
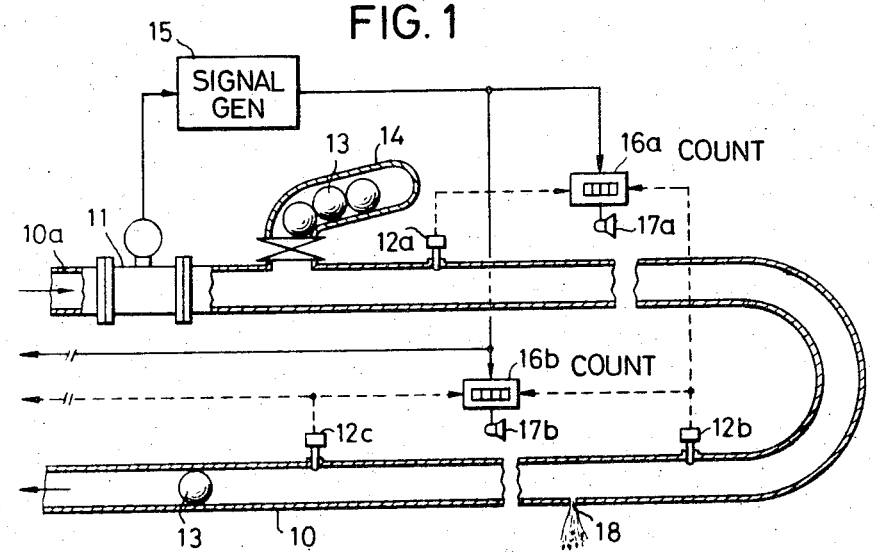
FIG. 1 is a schematic diagram, with parts cut away, showing the essential parts of a first embodiment of the abnormality detection system according to the invention.

The leakage detecting method and system of the invention is applicable, for example, to a pipeline 10 as illustrated in FIG. 1 laid over a certain distance from one end at an upstream position from which a liquid is to be sent to the other end at a downstream position where the liquid is to be received. Near the upstream end 10a of this pipeline 10, there is provided a flowmeter 11. The pipeline 10 is considered to be divided into consecutive detection sections with borders therebetween, at which there are provided sensors 12a, 12b, 12c, . . . . .etc. (collectively designated by reference numeral 12) for detecting the passage therepast of structures traveling along the interior of the pipe structure of the pipeline 10. In addition, a launcher 14 for launching spheres 13 into the pipe as the traveling structures is installed on the pipeline 10 at a point between the flowmeter 11 and the first sensor 12a.

A signal generator 15 is connected to the flowmeter 11 and operates to generate a pulse signal in accordance with the measurement by the flowmeter 11 and to transmit this signal to counters 16a, 16b, . . . etc. (collectively designated by reference numeral 16). These counters 16a, 16b, . . . ., etc., are provided respectively with alarms 17a, 17b, . . . etc. Furthermore, each of the counters 16a, 16b, etc., is supplied with detection signals from two sensors which determined the respective detection section. Each of the sensors 12a, 12b, 12c, . . . , etc., has a construction as described hereinafter and generates and transmits a detection signal as mentioned above whenever one of the spheres 13 passes by its position. For example, the counter 16a receives the detection signals of the sensors 12a and 12b, while the counter 16b receives the detection signals of the sensors 12b and 12c. The other counters and sensors are similarly interconnected although not shown in the drawings.

Figure 3:
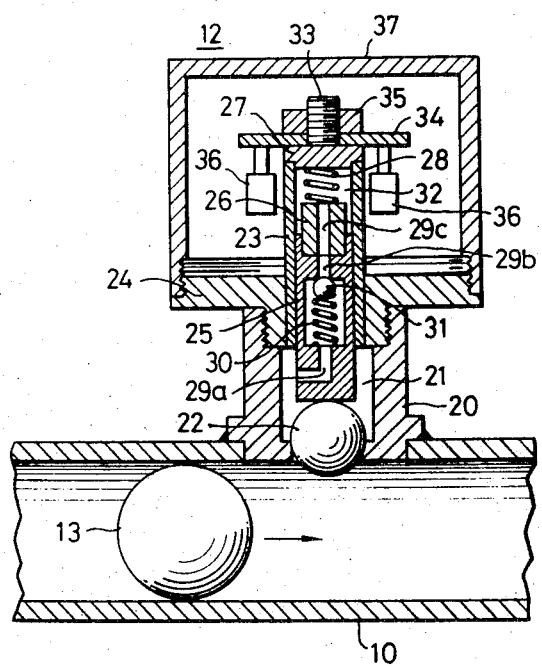
FIG. 3 is a side elevation, in vertical section, showing one embodiment of a sensor suitable for use in the system according to the invention.

An embodiment of a sensor 12 is illustrated in FIG. 3. The base support structure of this sensor is a hollow boss 20 fixedly mounted on the pipe wall of the pipeline 10, the lowermost part of this boss 20 being fitted into a hole in the pipe wall. The hollow chamber 21 of this boss contains at its bottom a ball 22 which is so supported that its lower part protrudes slightly into the pipe interior beyond the inner surface of the pipe wall. A base plate 24 is screw fitted in a fluid-tight manner to the upper part of the boss 20. A hollow cylindrical structure 23 made of a non-magnetic material is passed through and supported by the base plate 24, the lower part of the cylinder 23 extending substantially coaxially into the chamber 21. A movable member 25 is inserted in a slidable manner in the cylinder 23 and has a permanent magnet 26 fixed to the upper part thereof. The upper end of the cylinder 23 is closed and sealed by a lid 27, and a compression spring 28 is disposed between this lid 27 and the permanent magnet 26. The movable member 25 and the ball 22 are thereby urged continually downward by the force of the spring 28 and are normally in their lowermost position with the lower part of the ball protruding slightly into the pipe interior.

The movable member 25 is provided with through holes 29a and 29b, and the permanent magnet 26 is provided with a through hole 29c. The movable member 25 contains within its hollow interior a damper mechanism comprising a compression spring 30 and a ball 31 positioned above and on the spring 30 and disposed between the through holes 29a and 29b. When a liquid is flowing from the chamber 32 accommodting the spring 28 toward the chamber 21, this damper mechanism does not restrict this flow, but when the liquid flow is in the reverse direction from the chamber 21 toward the chamber 32, the damper mechanism operates to restrict this reverse flow.

the lid 27 is provided with a screw 33 projecting upward from its upper surface and passing through a central hole in a support plate 34 fitted thereonto and resting on the lid 27. A nut 35 engaged with the screw 33 is tightened to hold the support plate 34 against the lid. The support plate 34 supports reed switches 36, 36. The upper part of the cylinder 23, the support plate 34, the reed switches 36, 36, and other parts above the base plate 24, are all enclosed within a case 37 of inverted cup shape which is secured at its lower rim part to the base plate 24.

When a sphere 13 traveling through the pipeline 10 together with the liquid passes by and below the ball 22, it contacts this ball 22 and pushes it upward, whereby the movable member 25 and the permanent magnet 26 are lifted within the cylinder 23 against the force of the spring 28. At this time, a portion of the liquid within the chamber 32, not being restricted by the above described damper mechanism, moves rapidly into the chamber 21, whereby the upward movement of the movable member 25 and the permanent magnet 26 is quickly accomplished.

The upward movement of the permanent magnet 26 causes a variation in the magnetic flux from the permanent magnet 26 relative to the reed switches 36, 36, and the reed contact points of the reed switches 36, 36 are closed. Accordingly, a signal signifying the passage of a sphere 13 is sent to the counter 16.

Figure 4:
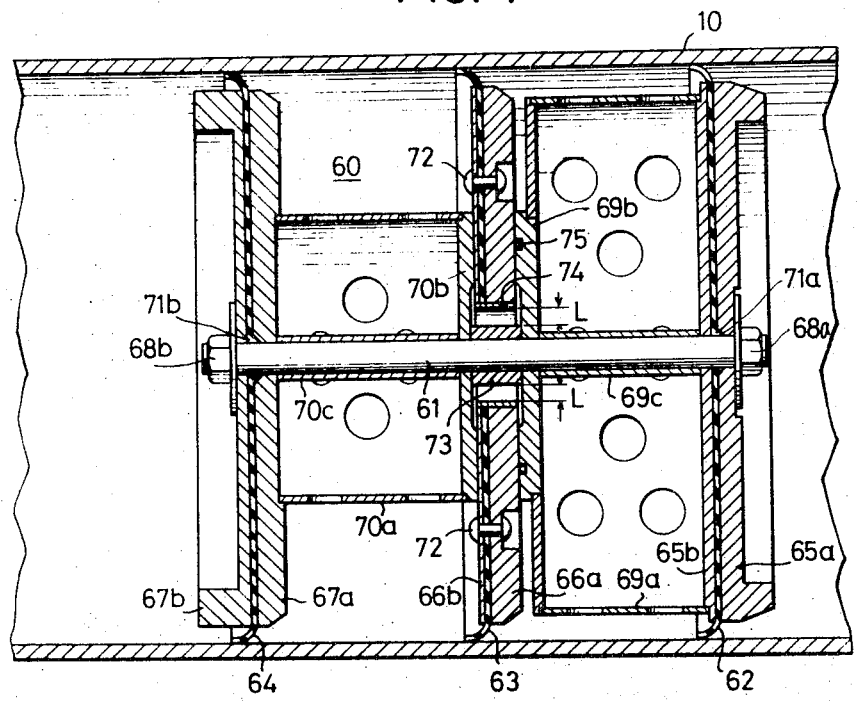
FIG. 4 is a side view in longitudinal section showing another embodiment of a traveling structure adapted to travel within the pipeline and constituting a part of the system of the invention.

As soon as the sphere 13 has passed by below the ball 22, the ball 22 is no longer subjected to a lifting force. Consequently, the permanent magnet 26 and the movable member 25 are urged downward by the force of the spring 28. At this time, however, the liquid tending to move from the chamber 21 to the chamber 32 is restricted in this movement by the damper mechanism comprising the spring 30 and the ball 31. Consequently, the permanent magnet 26 and the movable member 25 descend at a leisurely speed. For this reason, even if the sphere 13 passes by the ball 22 is an extremely short time, the reed switches 36, 36 will be positively closed, whereby a signal indicating the passing by of the sphere will be reliably transmitted. Furthermore, since the permanent magnet 26 descends slowly in this manner, even in the case where a traveling structure described hereinafter in conjunction with FIG. 4 is used in place of the sphere 13, the reed switches 36 do not produce chattering due to repetition of opening and closing.

The operation of leakage detection of the above described system will now be described under the assumption that there exists a leakage point in the pipeline 10 within the section divided and defined by the sensors 12b and 12c.

The liquid is sent from the upstream end 10a of the pipeline, from which the liquid is to be sent, in the arrow direction. Together with the sending of the liquid, the signal generator 15 operates in accordance with the result of measurement of the flowmeter 11 to transmit a pulse signal to counters 16a, 16b, etc. Then, when a check for leakage is to be carried out, one sphere 13 is launched into the pipe of the pipeline 10 from the launcher 14 loaded with a plurality of spheres 13. The sphere thus launched into the pipe travels within and along the pipeline 10 together with the flow of the liquid at the same velocity as the liquid flow.

Then, when this sphere 13 passes by the position, first, of the sensor 12a, this sensor transmits a signal indicating this fact, and this signal is sent to the counter 16a as a count starting signal. The counter 16a has a gate circuit (not shown) which is thereupon opened by this count starting signal, and the counter 16a starts to count the pulse signal sent from the signal generator 15.

Then, when the sphere 13 after traveling further along the pipeline 10 together with the liquid, passes by the second sensor 12b, the sensor 12b transmits a signal indicating the detection of the passage of the sphere. The signal thus transmitted is sent as a count stopping signal to the counter 16a and as a count starting signal to the counter 16b. The gate circuit of the counter 16a is closed by this count stopping signal, whereby the counter stops its operation of counting the pulse signal. At the same time, the counter 16b is caused by this count starting signal to start counting the pulse signal from the signal generator 15.

Then, when the sphere 13 travels further through the pipeline 10 together with the liquid and passes by the third sensor 12c, the sensor 12c sends a count stopping signal to the counter 16b and a count starting signal to the succeeding counter 16c (not shown). At this time, the counter 16b which has been counting in response to the signal from the sensor 12b stops its counting operation. Thereafter, the same operation as described above is carried out with respect to the succeeding counters and sensors (not shown).

Then, when there is a leak 18 in the pipeline 10 due to wear, damage, corrosion, or some other cause, one portion of the liquid sent through the pipeline 10 from the upstream end 10a thereof leaks out of the pipeline pipe structure through the leakage point 18. For this reason, the liquid in the pipeline 10 upstream from the leakage point 18 flows at the original normal flowrate, but in the pipeline downstream from the leakage point 18, the liquid flows with a flowrate which is decreased by the flowrate of the leakage from the point 18. consequently, the time for the sphere 13 to travel the distance of the section between the sensors 12a and 12b will be equal to the normal time predetermined for that section, but the time for the sphere to travel through the section between the sensors 12b and 12c will be greater than the normal time predetermined for that section.

Accordingly, the total count value of the counter 16a which starts counting in response to the signal from the sensor 12a and stops counting in response to the signal from the sensor 12b will be equal to a standard value which has been predetermined for the counter 16a of the section between the sensors 12a and 12b. However, the total count value of the counter 16b which starts counting in response to the signal from the sensor 12b and stops counting in response to the signal from the sensor 12c will be greater than a standard value which has been predetermined for the counter 16b of the section between the sensors 12b and 12c.

The counters 16a and 16b respectively have presetting devices each of which compares the corresponding total count value and a preset value and produces an output when the total count value exceeds the preset value. Accordingly, no output is produced from the counter 16a, but an output is produced from the counter 16b, and the alarm 17b operates to emit an alarm to indicate that a leak exists within the section determined by the sensors 12b and 12c with respect to the counter 16b. Furthermore, by reading the difference between the actual total count value of the counter 16b during this operation and the above mentioned predetermined value, it is possible to determine the magnitude of the leakage flowrate at the leakage point 18.

In this connection, instead of providing the counters 16a, 16b, etc. with alarms 17a, 17b, etc., the outputs of the counters 16a, 16b, etc, may be transmitted to a supervision center to activate alarm and indicating means provided in the center. In this case, centralized supervision can be carried out from a single center.

While in the above embodiment, this invention has been described with respect to its application to detection of leakage in a pipeline, the invention is by no means so limited, it being applicable also to the detection of abnormal conditions within a pipe. In the case where an abnormal condition occurs within the pipe, the traveling velocity of the sphere 13 deccreases because of damage to the sphere, and even when the sphere 13 is not damaged, a large quantity of the liquid flows downstream past the sphere. Accordingly, the total count value of the counter exceeds the predetermined value similarly as in the above described case of a leakage, and it is possible to detect the occurrence of the abnormal condition.

In presetting the predetermined values in the counters 16a, 16b, . . . etc., it is desirable that they should be preset with due consideration of the measurement error of the flowmeter relative to the predetermined count number and allowances in accordance with factors such as the effects of the kind and temperature of the liquid.

Figure 2:
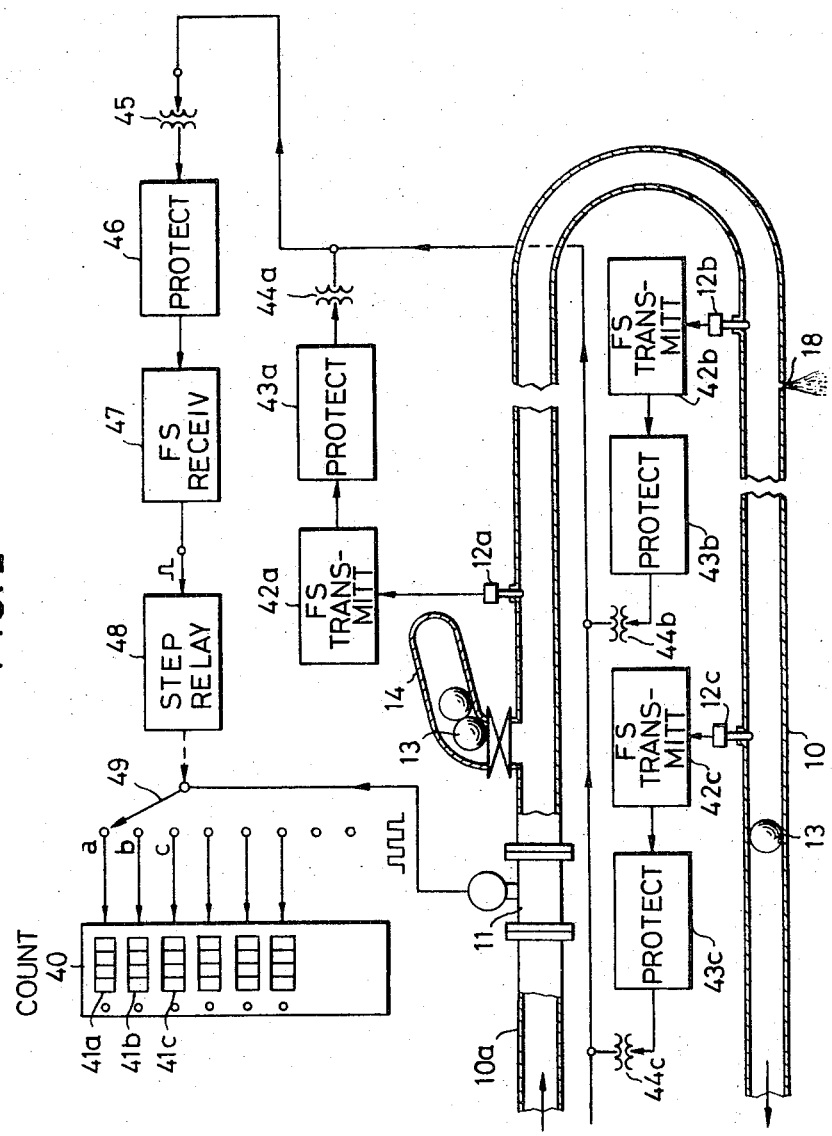
FIG. 2 is a similar schematic diagram showing the essential parts of a second embodiment of the abnormality detection system according to the invention.

A second embodiment of the system of the invention is illustrated in the schematic diagram of FIG. 2, in which parts identical or equivalent to those of FIG. 1 are designated by the same reference numerals, and description thereof will not be repeated in the following description.

In this embodiment system, a counter device 40 comprising, in combination, counters 41a, 41b, 41c, etc., corresponding to pipeline sections divided by sensors is installed at a specific point such as a point within a supervision office. Signals from the sensors 12a, 12b, 12c, . . . , etc., are sent to FS transmitters 42a, 42b, 42c, etc., (collectively designated by the reference numeral 42) for carrying out frequency shift keying or FS modulation, and the output signals thereof are respectively sent by way of protectors 43a, 43b, 43c, etc., (collectively designated by the reference numeral 43) and transformers 44a, 44b, 44c, etc. (collectively designated by the reference numeral 44) to a common line. These signals are further sent through a transformer 45 and a protector 46 to a FS receiver 47 for carrying out demodulation, and pulse signals thus demodulated are sent to a stepping relay 48. The stepping relay 48 operates once each time one of these pulse signals arrives and causes the rotating contact of a rotary switch 49 to carry out single-step rotary switching from contact a successively to contacts b, c, etc. The measuring signal from the flowmeter 11 is sent by way of the rotating contact of the rotary switch 49 and one of the contacts a, b, c, . . . , etc., with which the rotating contact is in contact to the corresponding counter 41. Other features of organization of this system are the same as or equivalent to those of the embodiment illustrated in FIG. 1.

When the sphere 13 is in launched from the launcher 14 similarly as in the preceding first embodiment, this sphere 13 travels through the pipeline 10 together with the flow of the liquid. When the sphere 13 passes by the sensor 12a, a signal is transmitted from the sensor 12a, and the stepping relay 48 operates to cause the rotating contact of the rotary switch 49 to contact the contact a. Accordingly, from this instant, the counter 41a starts counting the measuring pulse signals from the flowmeter 11.

Then, when the sphere 13 travels further through the pipeline 10 and passes by the sensor 12b, the sensor 12b transmits a signal whereby the stepping relay 48 is activated to cause the rotating arm of the rotary switch to contact the contact b. Accordingly, at this instant, the counter 41a stops counting the measuring pulse signal from the flowmeter 11, and the counter 41b connected to the contact b starts to count these pulse signals from the flowmeter 11.

Thereafter, in the same manner, the passing of the sphere 13 by the sensor 12c causes the rotating contact of the rotary switch 49 to be changed over from contact b to contact c, whereby the counter 41b stops counting, which counter 41c starts counting.

It will now be assumed that a leak exists at the point 18 within the pipeline section defined between the sensors 12b and 12c. Then, as was described with respect to the preceding first embodiment, the traveling velocity of the sphere 13 is lower downstream from the leakage point 18 than upstream therefrom. Consequently, the total count value of the counter 41b exceeds the preset value based on a predetermined value, whereupon the counter produces an output, which activates a specific alarm device. Depending on the necessity, means may be provided to operate in response to this output to close a shut-off valve provided in the pipeline 10 at its upstream end where the liquid is introduced thereinto.

Each of the above described first and second embodiments has an organization wherein a counter is provided for each pipeline section defined between two adjacent sensors, and the output of each sensor is used as a count stopping signal for the counting of one section and as a count starting signal for the counting of the adjacent section. In the case where there is a section not requiring the detection of leakage, however, an organization of the system wherein no counter is provided for this section, and the output of the upstream sensor of the two sensors on the two extremities of this section is sent as a count stopping signal to the counter of the adjacent section on the upstream side of this section not requiring detection, while the output of the downstream sensor of the above mentioned two sensors is sent as a count starting signal to the counter of the adjacent section downstream from this section not requiring detection may be used.

While a sphere is used as a traveling structure for traveling together with the liquid through the pipeline in each of the above described embodiments, a traveling structure as described below in conjunction with FIGS. 4 and 5 may also be used. This traveling structure is capable of traveling smoothly even through a curved pipe and, moreover, affords a positive seal with respect to the liquid. For this reason, there is no possibility of the flowing liquid flowing past this traveling structure. That is, this traveling structure has the advantage of being capable of traveling as a fully integral part of the liquid flow.

Figure 5:
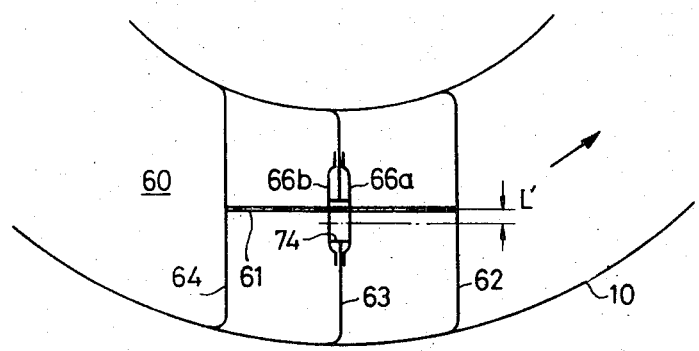
FIG. 5 is a diagrammatic view for a description of the state in which the pipe interior traveling structure illustrated in FIG. 4 travels through a curved pipe.

As shown in FIG. 5, this traveling structure 60 comprises, essentially, a central shaft or stem 61 and seals 62, 63, and 64 fitted on and fixed to the two ends and middle portion of the central stem. As shown in greater detail in FIG. 4, the three seals are mounted on the central stem 61 in respective states wherein the seal 62 is clamped between holding disk members 65a and 65b, the seal 63 is clamped between holding disk members 66a and 66b, and the seal 64 is clamped between holding disk members 67a and 67b. The outermost holding disk members 65a and 67b are respectively fixed to the ends of the central stem 61 by nuts 68a and 68b. Between the holding members 65b and 66a, there are interposed spacers 69a, 69b, and 69c, while between holding members 66b and 67a, there are interposed spacers 70a, 70b, and 70c. A spacer 73 is interposed between the spacers 69b and 70b. Packings 71a and 71b are provided to preserve water-tightness between the central stem 61 and the seals 62 and 64.

The seal 63 is fixed to the holding members 66a and 66b by rivets 72. A ring 74 having an inner diameter greater than the outer diameter of the spacer 73 is fitted on the central stem 61. When this traveling structure 60 is within a straight pipe, there is a clearance L between the inner peripheral rim of the ring 74 and outer periphery of the spacer 73. The above mentioned seal 63 and the holding members 66a and 66b are fitted on the ring 74. Accordingly, the ring 74, the seal 63, and the holding members 66a and 66b are respectively free to move integrally within the range of the clearance L from a neutral position in only a direction perpendicular to the central stem 61. A packing 75 is provided between the spacer 69b and the holding member 66a, which slides relative thereto, in order to preserve water-tightness therebetween.

The seals 62, 63, and 64 are made of an elastic material such as a rubber, and their diameters are made slightly greater than the inner diameter of the pipeline pipe. Accordingly, the peripheral part of each seal is pressed firmly against the inner wall surface of the pipe, whereby positive sealing of the liquid with respect to the upstream and downstream sides of the traveling structure 60 is established.

In the case where the traveling structure 60 passes through a curved pipe 10 as indicated in FIG. 5, the central stem 61 is in a position determined by the positions of the seals 62 and 64 relative to the pipe 10. On one hand, since the pipe 10 is curved between the seals 62 and 64, the seal 63 is offset at its center position by a distance L' from the central stem 61, but its peripheral part is maintained in its tightly pressed state against the inner wall surface of the pipe 10. Since there is the clearance L between the spacer 73 and the ring 74 at this time, this clearance L permits displacement of the seal 63 relative to the central stem 61. Thus, even when the traveling structure 60 travels through a curved pipe, the peripheral parts of the three seals 62, 63, and 64 are continually pressed against the inner wall surface of the pipe, whereby positive sealing of the liquid between the upstream and downstream sides of the traveling structure 60 is maintained.

Furthermore, even in the case where a welding bead, i.e., a projecting convex part, exists on the inner wall surface of the pipe 10, the seals 62, 63, and 64 slide smoothly over this bead as their peripheral parts are temporarily deformed by the bead. During this action, one of the three seals may not be able to maintain absolute water-tightness at the instant when it deforms to slide over the bead, but the other two seals are pressed firmly against the pipe inner wall surface and are thereby maintaining water-tightness. Therefore, even in such cases, positive sealing is achieved.

In some cases where some of the sections of the pipeline 10 do not require detection of leaks, the pipeline need not be of the same diameter over its entire length, and the diameter of the pipe may be made larger in such sections not requiring leakage detection. In such cases, since the traveling structure is not in continual sliding contact with the pipe wall, wear of and damage to the traveling structure are reduced.

Further, this invention is not limited to these embodiments but various variations and modifications may be made without departing from the scope and spirit of the invention.

What I claim is:

1. A system for detecting abnormalities in pipelines which comprises:
   a pipeline for transferring a fluid;
   a flowmeter installed in said pipeline at the upstream fluid sending end thereof and operating to measure the flow rate of the fluid flowing thereby and to produce accordingly a pulse signal;

a traveling structure for traveling through said pipeline together with and at the same velocity as the fluid;

means provided on the pipeline at a point downstream from said flowmeter to launch said traveling structure into the pipeline;

traveling structure detecting means comprising a plurality of pairs of sensors provided in the pipeline at positions divisionally defining specific sections thereof in which abnormal points can exist to cause the velocity of the fluid at said point to differ from the velocity of the fluid at normal positions of the pipeline, the downstream sensor of one pair of sensors is used doubly as the upstream sensor of the pair of sensors divisionally defining the section adjacently downstream from the section divisionally defined by the first named pair of sensors; and counting means operating in response to the detection signal of the upstream sensor of said a plurality of pairs of sensors to start counting said pulse signals produced by the flowmeter and in response to the detection signal of the other downstream sensor to stop counting said pulse signal and operating to produce an abnormality detection output when the resulting pulse signal count exceeds a preset specific value, said the counting means comprising a plurality of counters provided to correspond respectively to a plurality of pipeline sections divisionally defined by said plurality of pairs of sensors, said counting means being caused, in the case where there is an abnormality point within the pipeline section divisionally defined by said pair of sensors, to carry out counting in excess of the normal preset value by the increase in the time for the passage of the traveling structure through said pipeline section in excess of a normal reference passage time and thereby to produce said abnormality detection output, and each sensor thus doubly used being adapted to send a count stopping signal to the counter corresponding to the section for which said sensor functions as the downstream sensor and sends a count starting signal to the counter corresponding to the section for which said sensor functions as the upstream sensor.

2. A system for detecting abnormalities in pipelines which comprises:

a pipeline for transferring a fluid;

a flowmeter installed in said pipeline at the upstream fluid sending end thereof and operating to measure the flow rate of the fluid flowing thereby and to produce accordingly a pulse signal;

a traveling structure for traveling through said pipeline together with and at the same velocity as the fluid; means provided on the pipeline at a point downstream from said flowmeter to launch said traveling structure into the pipeline;

traveling structure detecting means comprising a plurality of pairs of sensors provided in the pipeline at positions divisionally defining specific sections thereof in which abnormal points can exist to cause the velocity of the fluid at said points to differ from the velocity of the fluid at normal positions of the pipeline, each of said sensors operating to detect the passage past the position thereof of the traveling structure and to produce accordingly a detection signal; and counting means comprises a plurality of counters corresponding respectively to a plurality of pipeline sections divisionally defined by said plurality of pairs of sensors and operating in response to the detection signal of the upstream sensor of said a plurality of pairs of sensors to start counting said pulse signals produced by the flowmeter and in response to the detection signal of the other downstream sensor to stop counting said pulse signal and operating to produce an abnormality detection output when the resulting pulse signal count exceeds a preset specific value, said counting means having an organization whereby, for every instance of generation of detection output signals from the sensors, the counter for carrying out the corresponding counting operation is successively selected, said counting means being caused, in the case where there is an abnormality point within the pipeline section divisionally defined by said pair of sensors, to carry out counting in excess of the normal preset value by the increase in the time for the passage of the traveling structure through said pipeline section in excess of a normal reference passage time and thereby to produce said abnormality detection output.

3. A system for detecting abnormalities in pipelines which comprises:

a pipeline for transferring a fluid;

a flowmeter installed in said pipeline at the upstream fluid sending end thereof and operating to measure the flow rate of the fluid flowing thereby and to produce accordingly a pulse signal:

a traveling structure for traveling through said pipeline together with and at the same velocity as the fluid;

means provided on the pipeline at a point downstream from said flowmeter to launch said traveling structure into the pipeline; traveling structure detecting means comprising at least one pair of sensors provided in the pipeline at positions divisionally defining a specific section thereof in which abnormal points can exist to cause the velcoity of the fluid at said points to differ from the velocity of the fluid at normal positions of the pipeline, each of said sensors operating to detect the passage past the position thereof of the traveling structure and to produce accordingly a detection signal; and counting meand operating in response to the detection signal of the upstream sensor of said at least one pair of sensors to start counting said pulse signals produced by the flowmeter and in response to the detection signal of the other downstream sensor to stop counting said pulse signal and operating to produce an abnormality detection output when the resulting pulse signal count exceeds a preset specific value;

said counting means being caused, in the case where there is an abnormality point within the pipeline section divisionally defined by said pair of sensors, to carry out counting in excess of the normal preset value by the increase in the time for the passage of the traveling structure through said pipeline section in excess of a normal reference passage time and thereby to produce said abnormality detection output; and said traveling structure comprising a central stem, a pair of end seal members fixed to respective ends of said central stem and adapted to contact the pipe inner wall surface of the pipeline, and an intermediate seal member disposed at an intermediate part of the central steam in a manner permitting displacement of said member only in directions perpendicular to the axis of the central stem and adapted to contact the pipe inner wall surface of the pipeline.

4. A system for detecting abnormalities in pipelines which comprises:
a pipeline for transferring a fluid;
a flowmeter installed in said pipeline at the upstream fluid sending end thereof and operating to measure the flow rate of the fluid flowing thereby and to produce accordingly a pulse signal;
a traveling structure for traveling through said pipeline together with and at the same velocity as the fluid;
means provided on the pipeline at a point downstream from said flowmeter to launch said traveling structure into the pipeline;
traveling structure detecting means comprising a plurality of pairs of sensors provided in the pipeline at positions divisionally defining specific sections thereof in which abnormal points can exist to cause the velocity of the fluid at said points to differ from the velocity of the fluid at normal positions of the pipeline, each of said sensors operating to detect the passage past the position thereof of the traveling structure and to produce accordingly a detection signal; and
counting means comprising a plurality of counters and operating in response to the detection signal of the upstream sensor of said a plurality of pairs of sensors to start counting said pulse signals produced by the flowmeters and in response to the detection signal of the other downstream sensor to stop counting said pulse signal and operating to produce an abnormality detection output when the resulting pulse signal count exceeds a preset specific value;
said counting means being caused, in the case where there is an abnormality point within the pipeline section divisionally defined by said pair of sensors, to carry out counting in excess of the normal preset value by the increase in the time for the passage of the traveling structure through said pipeline section in excess of a normal reference passage time and thereby to produce said abnormality detection output.

* * * * *